US011163637B1

(12) United States Patent
Bikumala et al.

(10) Patent No.: US 11,163,637 B1
(45) Date of Patent: Nov. 2, 2021

(54) DETERMINING SERVER ISSUES RELATED TO SOFTWARE VERSIONS USING ARTIFICIAL INTELLIGENCE TECHNIQUES

(71) Applicant: Dell Products L.P., Round Rock, TX (US)

(72) Inventors: Sathish K. Bikumala, Round Rock, TX (US); Deepak Nagarajegowda, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/026,472

(22) Filed: Sep. 21, 2020

(51) Int. Cl.
*G06F 11/07* (2006.01)

(52) U.S. Cl.
CPC ...... *G06F 11/0793* (2013.01); *G06F 11/0706* (2013.01); *G06F 11/079* (2013.01)

(58) Field of Classification Search
CPC . G06F 11/0706; G06F 11/079; G06F 11/0793
See application file for complete search history.

(56) References Cited

U.S. PATENT DOCUMENTS

| 7,484,132 | B2 * | 1/2009 | Garbow | G06F 11/008 |
| | | | | 714/26 |
| 8,151,257 | B2 | 4/2012 | Zachmann | |
| 8,397,301 | B2 | 3/2013 | Hering et al. | |
| 10,073,683 | B2 * | 9/2018 | Prasad | G06F 11/0706 |
| 10,394,633 | B2 | 8/2019 | Patil et al. | |
| 2019/0108001 | A1 * | 4/2019 | Hauser | G06F 11/362 |
| 2020/0285564 | A1 * | 9/2020 | Ciano | G06F 11/3612 |

* cited by examiner

*Primary Examiner* — Joseph R Kudirka
(74) *Attorney, Agent, or Firm* — Ryan, Mason & Lewis, LLP

(57) ABSTRACT

Methods, apparatus, and processor-readable storage media for determining server issues related to software versions using artificial intelligence techniques are provided herein. An example computer-implemented method includes determining one or more server issues, among multiple reported server issues, as being related to one or more software version states; labeling, using at least one clustering algorithm, each of at least a subset of the servers as being associated with at least one of the determined server issues; generating, by processing data pertaining to at least a portion of the labeled servers using artificial intelligence techniques, at least one knowledge base identifying automated actions to be carried out in response to observed data related to the one or more server issues; monitoring metrics across at least a portion of the one or more servers; and performing one or more automated actions based on the monitoring and the at least one knowledge base.

20 Claims, 10 Drawing Sheets

```
# Function: K Means
# ---------------
# K-Means is an algorithm that takes in a dataset and a constant
# k and returns k centroids (which define clusters of data in the
# dataset which are similar to one another).
def k-means(dataSet, k):

# Initialize centroids randomly
    numFeatures = dataSet.getNumFeatures()
    centroids = getRandomCentroids(numFeatures, k)

# Initialize book-keeping vars.
    iterations = 0
    oldCentroids = None

# Run the main k-means algorithm
    while not shouldStop(oldCentroids, centroids, iterations):
        # Save old centroids for convergence test. Book-keeping.
        oldCentroids = centroids
        iterations += 1

# Assign labels to each datapoint based on centroids
        labels = getLabels(dataSet, centroids)

# Assign centroids based on datapoint labels
        centroids = getCentroids(dataSet, labels, k)

# We can get the labels too by calling getLabels(dataSet, centroids)
    return centroids
```

FIG. 5

```
# Function: Get Labels
# ------------
# Returns a label for each piece of data in the dataset.
def getLabels(dataSet, centroids):
    # For each element in the dataset, chose the closest centroid.
    # Make that centroid the element's label.
```

FIG. 6

```
# Function: Get Centroids
# ----------------
# Returns k random centroids, each of dimension n.
def getCentroids(dataSet, labels, k):
    # Each centroid is the geometric mean of the points that
    # have that centroid's label. Important: If a centroid is empty (no points have
    # that centroid's label) you should randomly re-initialize it.
```

FIG. 7

DETERMINING SERVER ISSUES RELATED TO SOFTWARE VERSIONS USING ARTIFICIAL INTELLIGENCE TECHNIQUES

FIELD

The field relates generally to information processing systems, and more particularly to server management using such systems.

BACKGROUND

Servers represent critical components in data center environments. Although many data center environments include failover mechanisms and/or disaster recovery mechanisms, users can nonetheless spend considerable time and resources identifying and resolving server-related issues that arise, particularly with respect to software versions. Conventional issue management techniques, however, do not typically identify root causes of software version-related issues, which can lead to significant instances of false negatives and waste of management resources.

SUMMARY

Illustrative embodiments of the disclosure provide techniques for determining server issues related to software versions using artificial intelligence (AI) techniques. An exemplary computer-implemented method includes determining one or more server issues, among multiple reported server issues within at least one system of one or more servers, as being related at least in part to one or more software version states within the at least one system, and labeling, using at least one clustering algorithm, each of at least a subset of the one or more servers as being associated with at least one of the one or more determined server issues. The method also includes generating, by processing data pertaining to at least a portion of the one or more labeled servers using one or more artificial intelligence techniques, at least one knowledge base identifying one or more automated actions to be carried out in response to observed data related to the one or more server issues. Further, the method additionally includes monitoring one or more metrics across at least a portion of the one or more servers, and performing one or more automated actions based at least in part on the monitoring and the at least one knowledge base.

Illustrative embodiments can provide significant advantages relative to conventional issue management techniques. For example, problems associated with significant instances of false negatives and management resource waste arising from failures to identify root causes of software version-related issues are overcome in one or more embodiments through identifying server issues related to software versions using artificial intelligence techniques, and performing automated actions in response thereto.

These and other illustrative embodiments described herein include, without limitation, methods, apparatus, systems, and computer program products comprising processor-readable storage media.

BRIEF DESCRIPTION OF THE DRAWINGS

FIG. 5 shows example pseudocode for implementing at least a portion of a clustering technique in an illustrative embodiment.

FIG. 6 shows example pseudocode for implementing at least a portion of a clustering technique in an illustrative embodiment.

FIG. 7 shows example pseudocode for implementing at least a portion of a clustering technique in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
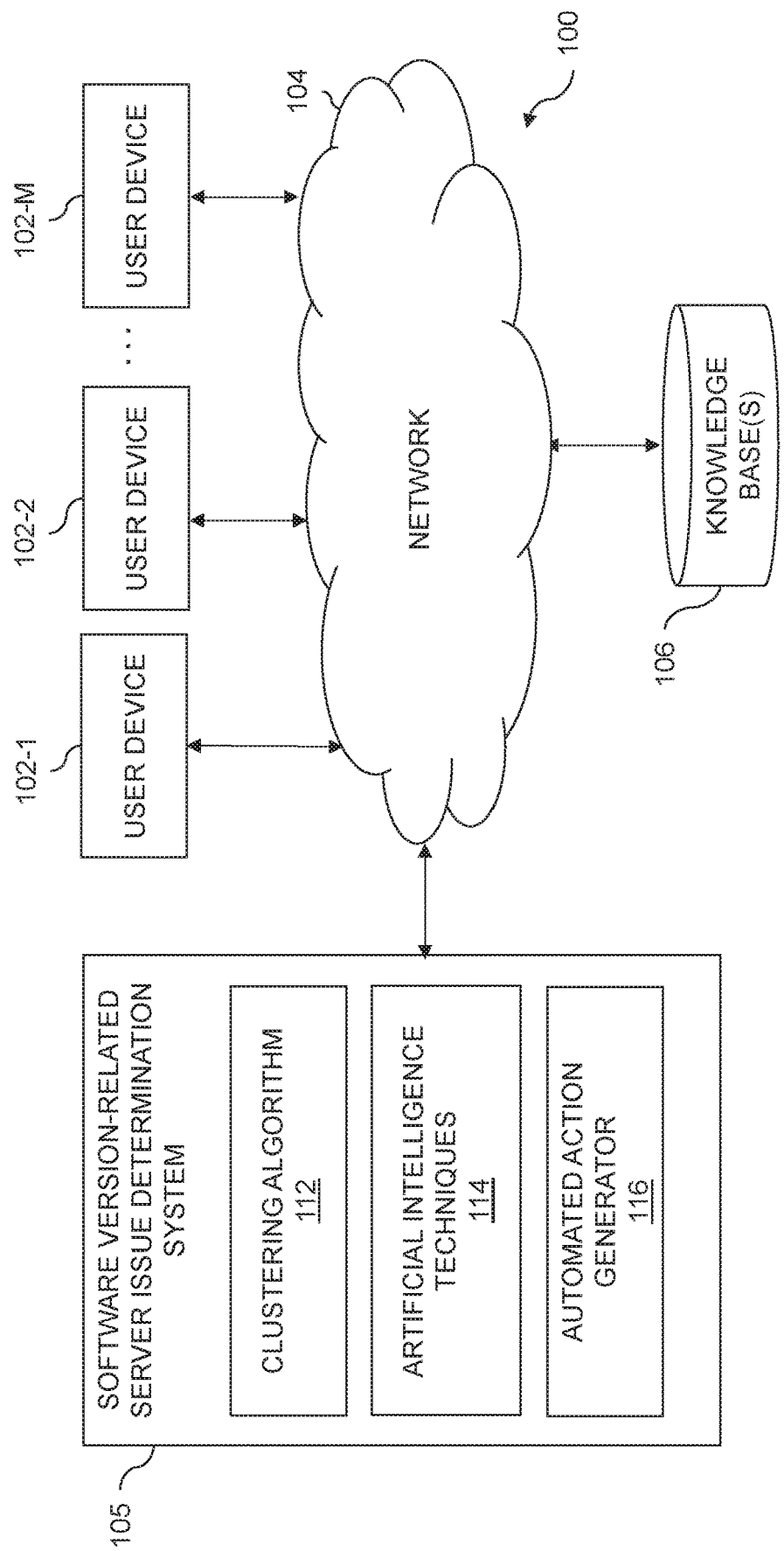
FIG. 1 shows an information processing system configured for determining server issues related to software versions using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is software version-related server issue determination system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, software version-related server issue determination system 105 can have at least one associated knowledge base 106 configured to store data pertaining to server-related issues, software versioning information, and remedial and/or resolution-related actions and techniques.

An example knowledge base 106, such as depicted in the present embodiment, can be implemented using one or more storage systems associated with software version-related server issue determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with software version-related server issue determination system 105 are one or more input-output devices, which illustratively comprise keyboards, displays or other types of input-output devices in any combination. Such input-output devices can be used, for example, to support one or more user interfaces to software version-related server issue determination system 105, as well as to support communication between software version-related server issue determination system 105 and other related systems and devices not explicitly shown.

Additionally, software version-related server issue determination system 105 in the FIG. 1 embodiment is assumed to be implemented using at least one processing device. Each such processing device generally comprises at least one processor and an associated memory, and implements one or more functional modules for controlling certain features of software version-related server issue determination system 105.

More particularly, software version-related server issue determination system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows software version-related server issue determination system 105 to communicate over the network 104 with the user devices 102, and illustratively comprises one or more conventional transceivers.

The software version-related server issue determination system 105 further comprises a clustering algorithm 112, artificial intelligence techniques 114, and an automatic action generator 116.

It is to be appreciated that this particular arrangement of modules 112, 114 and 116 illustrated in the software version-related server issue determination system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for determining server issues related to software versions using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of software version-related server issue determination system 105 and knowledge base(s) 106 can be on and/or part of the same processing platform.

An exemplary process utilizing modules 112, 114 and 116 of an example software version-related server issue determination system 105 in computer network 100 will be described in more detail with reference to the flow diagram of FIG. 8.

Accordingly, at least one embodiment includes analyzing historical data pertaining to software versions and/or software upgrade issues over a given period of time, which involves monitoring software upgrade cycles and associated user issues to build a knowledge base using at least one deep learning model. Additionally, such an embodiment includes training an AI bot (also referred to herein as a specialized software agent) using the knowledge base to perform tasks directly on a system based at least in part on monitoring of data and/or health performance information of the system.

Figure 2:
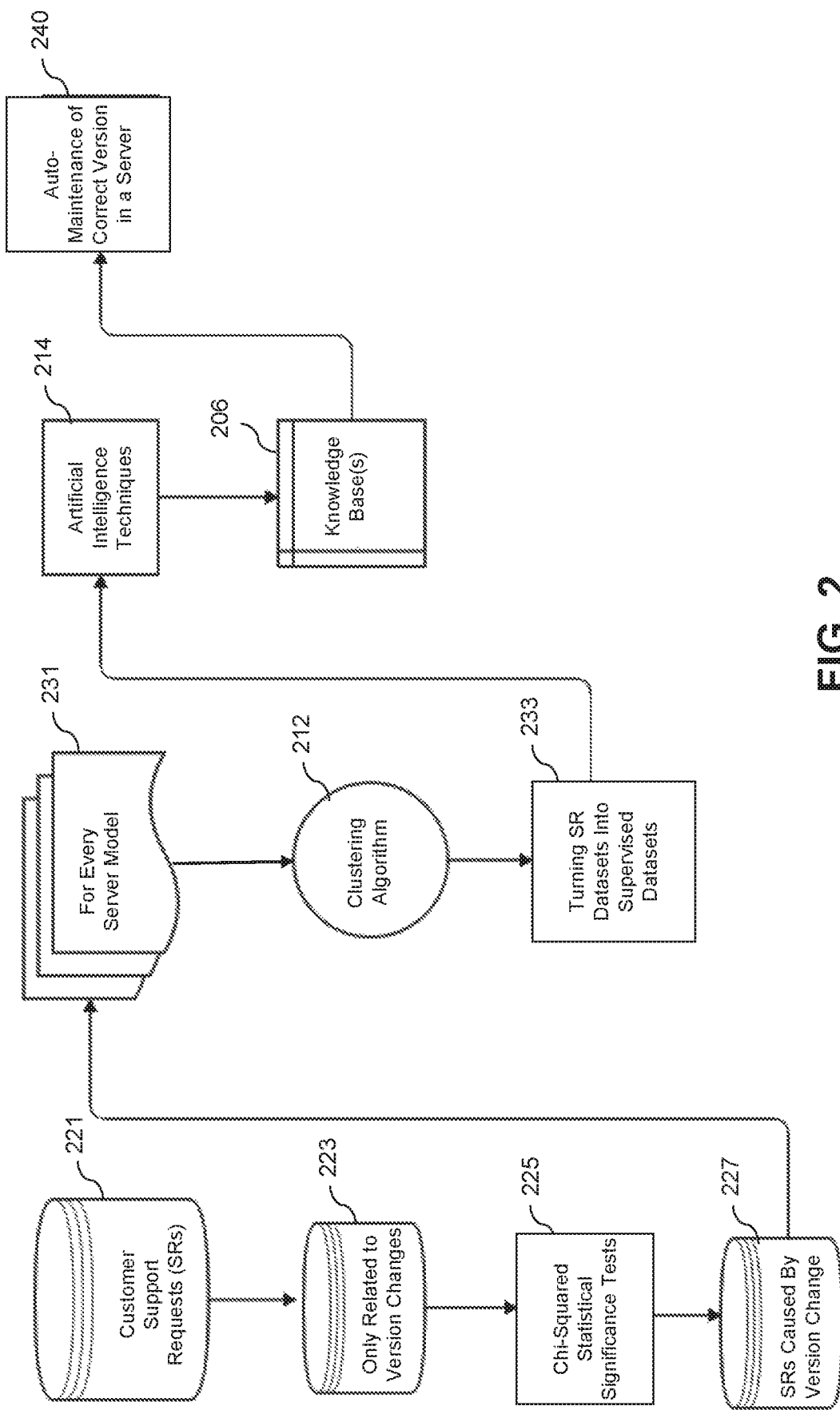
FIG. 2 shows a workflow diagram for determining server issues related to software versions using artificial intelligence techniques in an illustrative embodiment.

FIG. 2 shows a workflow diagram for determining server issues related to software versions using artificial intelligence techniques in an illustrative embodiment. By way of illustration, FIG. 2 depicts utilization of a database 221 of lifetime data of issues (also referred to herein as support requests (SRs)) reported for one or more customers of one or more servers products. Such an embodiment includes processing at least a portion of the data in database 221 to extract and/or derive a subset 223 of such data, wherein the subset 223 includes data related to software version changes and/or upgrades. Also, using one or more chi-square statistical significance tests 225 to process the data in subset 223, such an embodiment includes determining if any of the issues (i.e., SRs) 227 were caused solely by at least one software version change and/or upgrade. One or more embodiments can include, for example, sub-selecting only those issues that have a statistical significance (that is, a statistical significance that indicates that software versioning was the primary and/or sole factor for causing the issue(s)).

As also depicted in FIG. 2, system parameters are analyzed, for every relevant model of server 231, to ascertain the level of impact and the resolution that was applied to such issues 227. Further, using at least one clustering algorithm 212 (for example, database (DB) scan clustering techniques), labels are applied to at least portions of the processed data to aid in the creation of one or more supervised datasets 233 to map at least a portion of information including the software upgrade(s), the software version(s), the corresponding server/system model(s), the issue(s) caused, and the resolution technique(s) applied.

Additionally, FIG. 2 depicts using AI techniques 214 (such as, for example, a deep learning model) to utilize the one or more supervised datasets 233 to train and/or generate a knowledge base 206 (e.g., a knowledge base in the form of "if this, then that") which identifies resolution techniques and/or actions to be carried out in response to certain data-based conditions and/or metrics. An example embodiment such as depicted in FIG. 2 also includes training, using at least the knowledge base 206, a cognitive AI bot 240 to automatically execute one or more tasks based on one or more observed conditions. Accordingly, the AI bot 240, upon determining and/or observing a given issue, will automatically perform a particular resolution technique and/or troubleshooting action to keep the corresponding server(s) running while attempting to remedy the issue(s).

As detailed herein, at least one embodiment includes determining and/or understanding what caused a given server-related issue and when the issue was caused or occurred. By way merely of example, one possible root cause behind performance issues in server systems can be the result of a change in system configuration among, for example, server system composition (e.g., central processing unit (CPU), graphics processing unit (GPU), etc.) and disk types (e.g., hard disk drive (HDD), SSD, etc.).

Additionally, one or more embodiments include determining and/or making sure that one or more software version changes represent the primary reason behind an issue (or support request) through the use of one or more chi-squared tests. Such an embodiment can also include utilizing at least one clustering algorithm to group together servers associated with SRs and those not associated with SRs, and labeling such servers (or data related thereto) accordingly.

Figure 3:
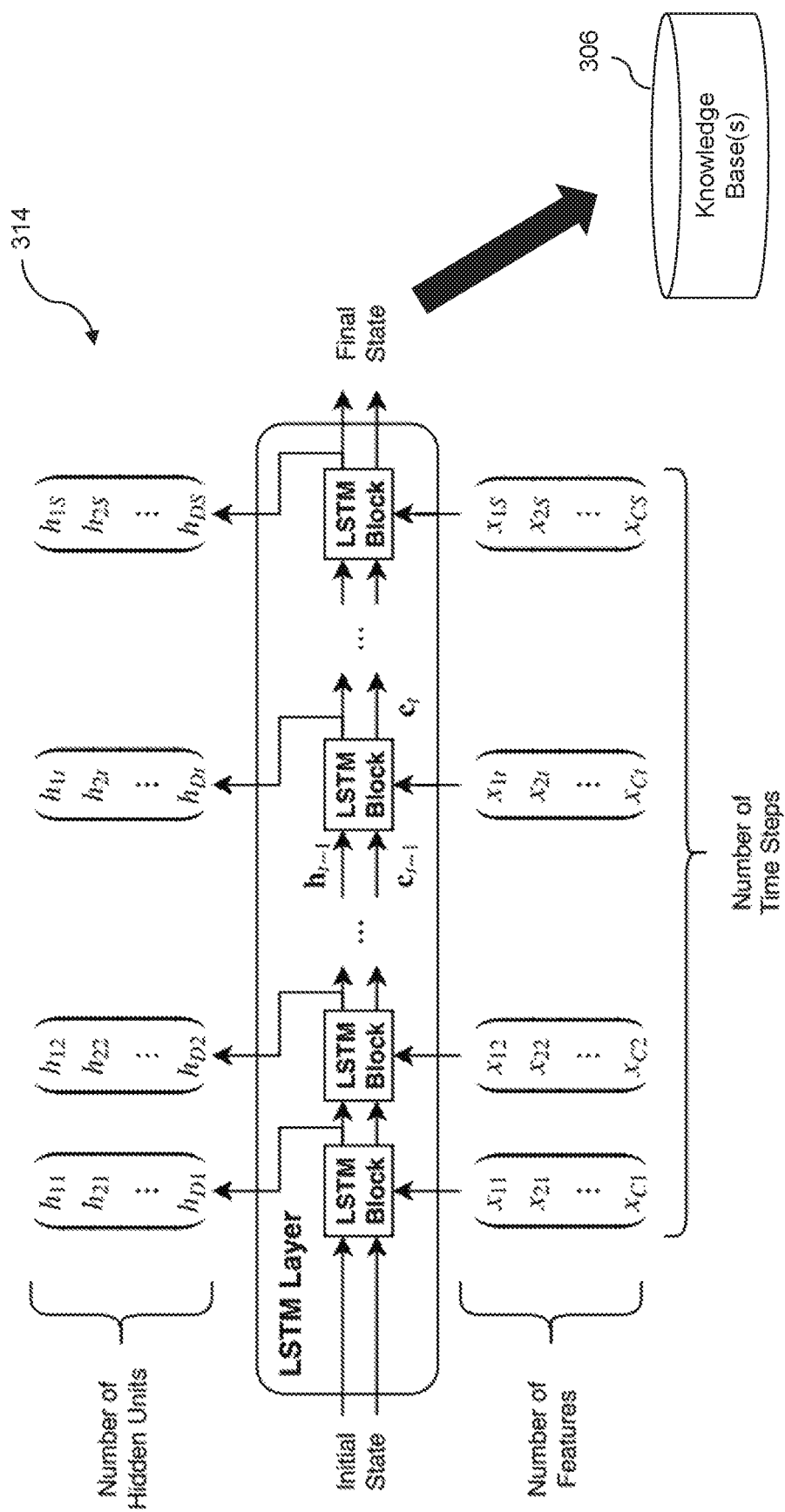
FIG. 3 shows implementation of a deep learning model to build a knowledge base in an illustrative embodiment.

Also, at least one embodiment includes utilizing one or more AI techniques (such as a deep learning algorithm or model) to build a knowledge base pertaining to responding to server-related issues. By way of example, FIG. 3 shows implementation of a deep learning model 314 to build and/or train knowledge base 306 in an illustrative embodiment. In the example embodiment depicted in FIG. 3, deep learning model 314 includes long short-term memory (LSTM) architecture which is composed of at least one cell, an input gate, an output gate and a forget gate. The at least one cell remembers values over arbitrary time intervals, and the three gates regulate the flow of information into and out of the cell in connection with a given number of features and a given number of hidden units. Such an example LSTM network is utilized in one or more embodiments to process and classify data, and generate one or more predictions based on time series data (as, for example, there can be lags of unknown duration between important events in a time series). In such an example embodiment as depicted in FIG. 3, input data can pertain to server performance metrics data, and an output can include the identification of one or more actions that need to be executed (which can be used to build and/or train knowledge base 306). For example, such a determined condition and responsive action (used to build and/or train knowledge base 306) can include the following: if read throughput is <2000 per minute, check the version map, then apply the latest firmware upgrade of the hard disk component.

As also detailed herein, one or more embodiments include programming and/or training at least one AI bot based at least in part on at least one generated knowledge base. Such an embodiment can include designing one or more automation processes using, for example, a visualized tool that utilizes drag-and-drop functionality. Also, in such an embodiment, an orchestrator (e.g., a web application) is used to deploy, monitor, and manage the AI bot(s), which can execute the designed automation processes.

Figure 4:
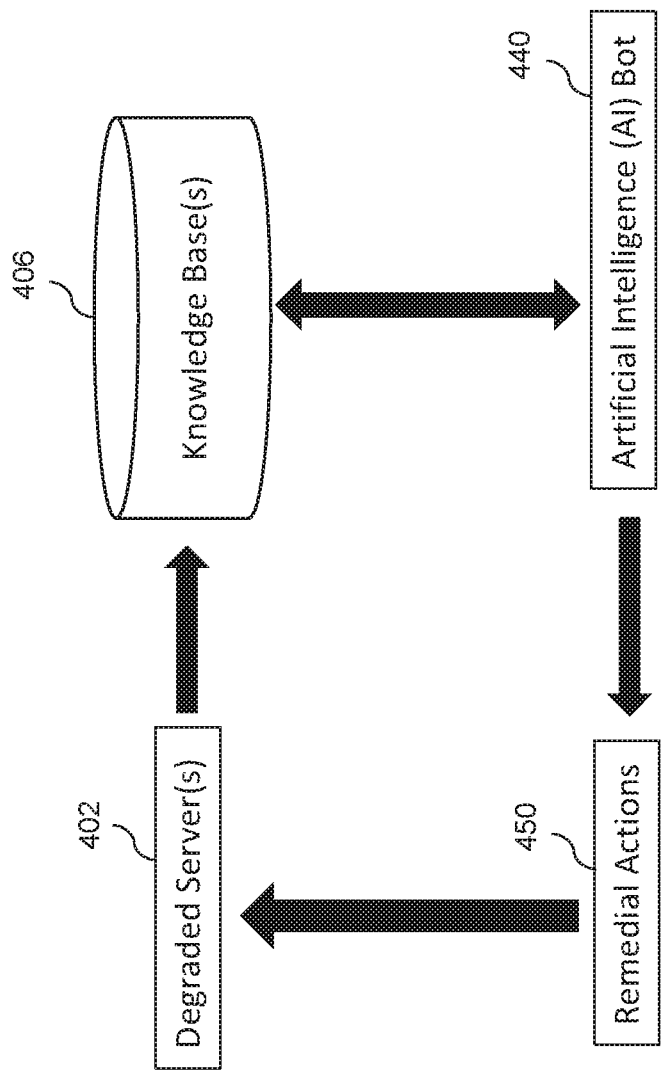
FIG. 4 shows implementation of an AI bot in an illustrative embodiment.

FIG. 4 shows implementation of an AI bot in an illustrative embodiment. By way of illustration, FIG. 4 depicts at least one degraded server 402, which provides data (e.g., performance data) which is compared against and/or processed in connection with a knowledge base 406. The knowledge base 406 is then used to train AI bot 440, which carries out one or more remedial actions 450 in connection with degraded server(s) 402 in an attempt to resolve one or more issues.

FIG. 5 shows example pseudocode for implementing at least a portion of a clustering technique in an illustrative embodiment. In this embodiment, example pseudocode 500 is executed by or under the control of at least one processing system and/or device. For instance, the example pseudocode 500 may be viewed as comprising a portion of a software implementation of at least part of software version-related server issue determination system 105 of the FIG. 1 embodiment.

The example pseudocode 500 illustrates at least a portion of a k-means algorithm function. More specifically, pseudocode 500 depicts steps for the k-means clustering algorithm to classify and label portions of a dataset (e.g., by returning centroids that define clusters within the dataset and assigning labels related thereto).

It is to be appreciated that this particular example pseudocode shows just one example implementation of a portion of a clustering technique, and alternative implementations of the process can be used in other embodiments.

FIG. 6 shows example pseudocode for implementing at least a portion of a clustering technique in an illustrative embodiment. In this embodiment, example pseudocode 600 is executed by or under the control of at least one processing system and/or device. For instance, the example pseudocode 600 may be viewed as comprising a portion of a software implementation of at least part of software version-related server issue determination system 105 of the FIG. 1 embodiment.

The example pseudocode 600 illustrates at least a portion of a get labels function. More specifically, pseudocode 600 illustrates a function which takes each row representing server performance metrics data and returns a label to indicate whether such data represent an acceptable performing context or an issue context.

It is to be appreciated that this particular example pseudocode shows just one example implementation of a portion of a clustering technique, and alternative implementations of the process can be used in other embodiments.

FIG. 7 shows example pseudocode for implementing at least a portion of a clustering technique in an illustrative embodiment. In this embodiment, example pseudocode 700 is executed by or under the control of at least one processing system and/or device. For instance, the example pseudocode 700 may be viewed as comprising a portion of a software implementation of at least part of software version-related server issue determination system 105 of the FIG. 1 embodiment.

The example pseudocode 700 illustrates at least a portion of a get centroids function. More specifically, pseudocode 700 illustrates a function which takes each row representing server performance metrics data and returns a centroid to indicate to which cluster the corresponding data belongs.

It is to be appreciated that this particular example pseudocode shows just one example implementation of a portion of a clustering technique, and alternative implementations of the process can be used in other embodiments.

Figure 8:
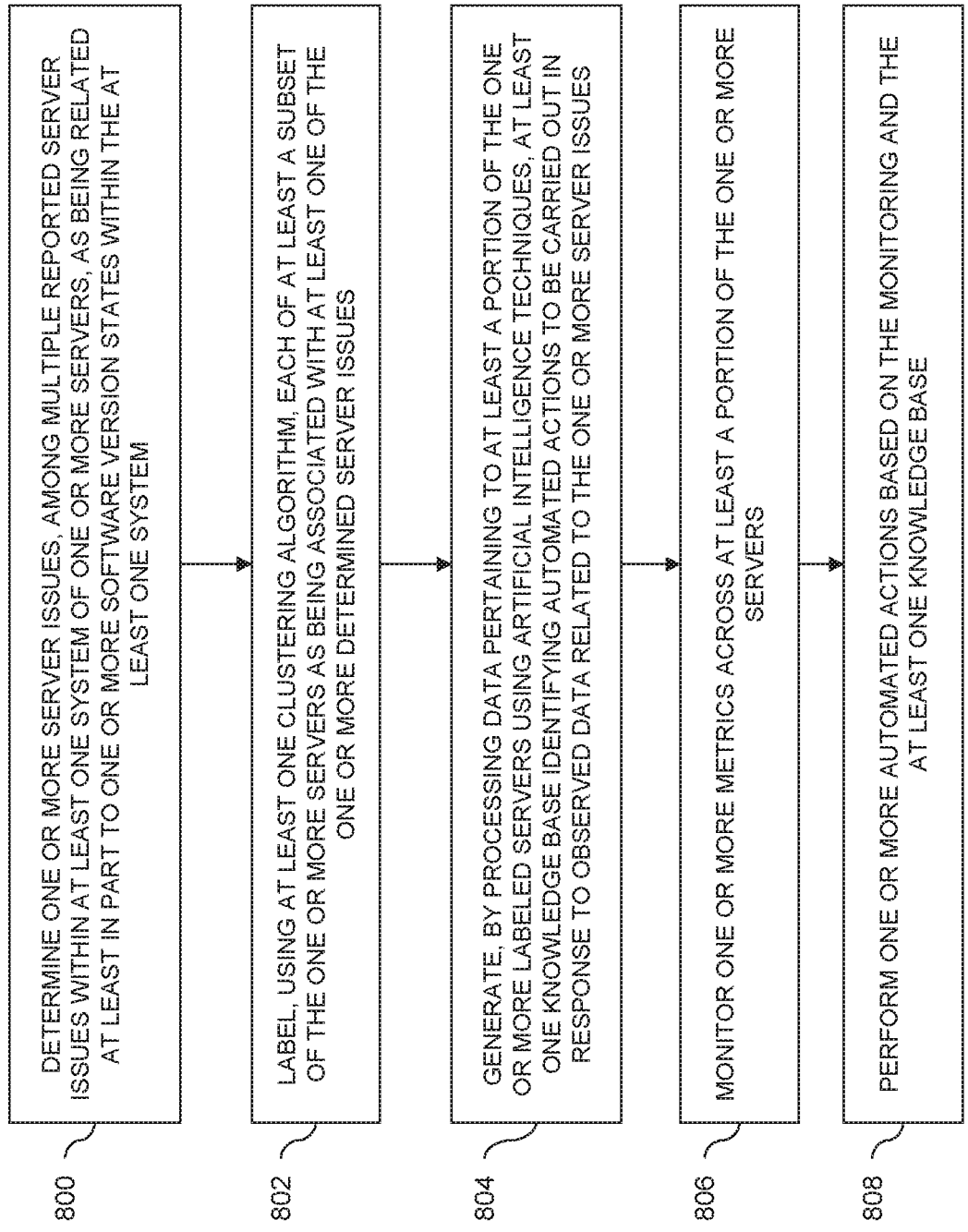
FIG. 8 is a flow diagram of a process for determining server issues related to software versions using artificial intelligence techniques in an illustrative embodiment.

FIG. 8 is a flow diagram of a process for determining server issues related to software versions using artificial intelligence techniques in an illustrative embodiment. It is to be understood that this particular process is only an example, and additional or alternative processes can be carried out in other embodiments.

In this embodiment, the process includes steps 800 through 808. These steps are assumed to be performed by the software version-related server issue determination system 105 utilizing its modules 112, 114 and 116.

Step 800 includes determining one or more server issues, among multiple reported server issues within at least one system of one or more servers, as being related at least in part to one or more software version states within the at least one system. In at least one embodiment, determining the one or more server issues related at least in part to one or more software version states includes processing information pertaining to at least a portion of the multiple reported server issues using one or more chi-squared tests. In such an embodiment, determining the one or more server issues related at least in part to one or more software version states includes selecting the one or more server issues having a statistical significance based on the one or more chi-squared tests.

Step 802 includes labeling, using at least one clustering algorithm, each of at least a subset of the one or more servers as being associated with at least one of the one or more determined server issues. It is to be appreciated that in one or more embodiments, a given server can have multiple labels and be associated with multiple server issues, different servers can be associated with the same server issue, some servers can be associated with no server issues, etc.

In at least one embodiment, using the at least one clustering algorithm includes processing configuration data of the one or more servers using the at least one clustering algorithm. Additionally or alternatively, in one or more embodiments, labeling each of at least a subset of the one or more servers includes creating at least one supervised dataset to map information pertaining to at least one of one or more software upgrades, one or more software versions, one or more server models, one or more server issue descriptions, and one or more server issue resolution actions.

Step 804 includes generating, by processing data pertaining to at least a portion of the one or more labeled servers using one or more artificial intelligence techniques, at least one knowledge base identifying one or more automated actions to be carried out in response to observed data related to the one or more server issues. In at least one embodiment, the one or more artificial intelligence techniques include at least one deep learning model, and wherein generating the at least one knowledge base includes training the at least one deep learning model using the data pertaining to at least a portion of the one or more labeled servers. Also, in one or more embodiments, the observed data related to the one or more server issues include one or more parameter values for one or more parameter conditions that exceed a given threshold amount.

Step 806 includes monitoring one or more metrics across at least a portion of the one or more servers. Step 808 includes performing one or more automated actions based at least in part on the monitoring and the at least one knowledge base.

The techniques depicted in FIG. 8 can also include training at least one artificial intelligence-based specialized software agent (also referred to herein as an AI bot, as noted above) using at least the at least one knowledge base. In such an embodiment, monitoring the one or more metrics across the at least a portion of the one or more servers can be carried out automatically using the at least one artificial intelligence-based specialized software agent. Additionally or alternatively, in such an embodiment, performing the one or more automated actions can be carried out using the at least one artificial intelligence-based specialized software agent upon a determination that at least one of multiple conditions specified in the at least one knowledge base is met. In such an embodiment, the one or more automated actions can include automatically performing, via the at least one artificial intelligence-based specialized software agent, one or more software version upgrades within the at least one system.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to identify server issues related to software versions using artificial intelligence techniques and perform automated actions in response thereto. These and other embodiments can effectively overcome problems associated with significant instances of false negatives arising from attempts to determine and/or identify root causes of software version-related issues.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
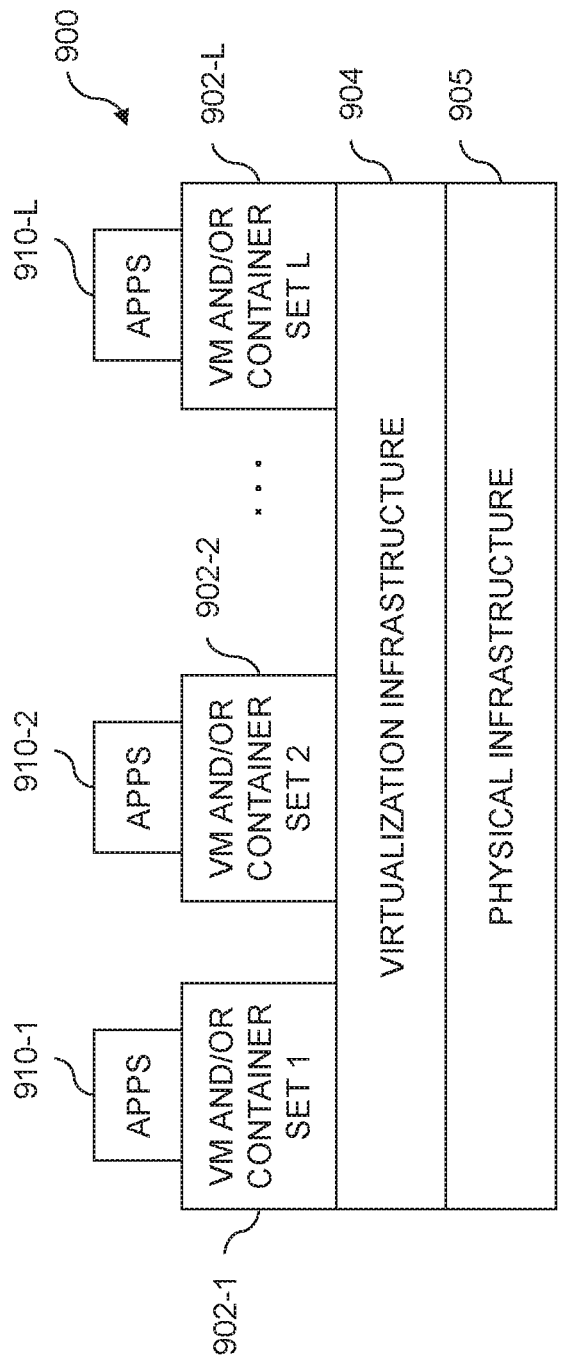
FIGS. 9 and 10 show examples of processing platforms that may be utilized to implement at least a portion of an information processing system in illustrative embodiments.
Figure 10:
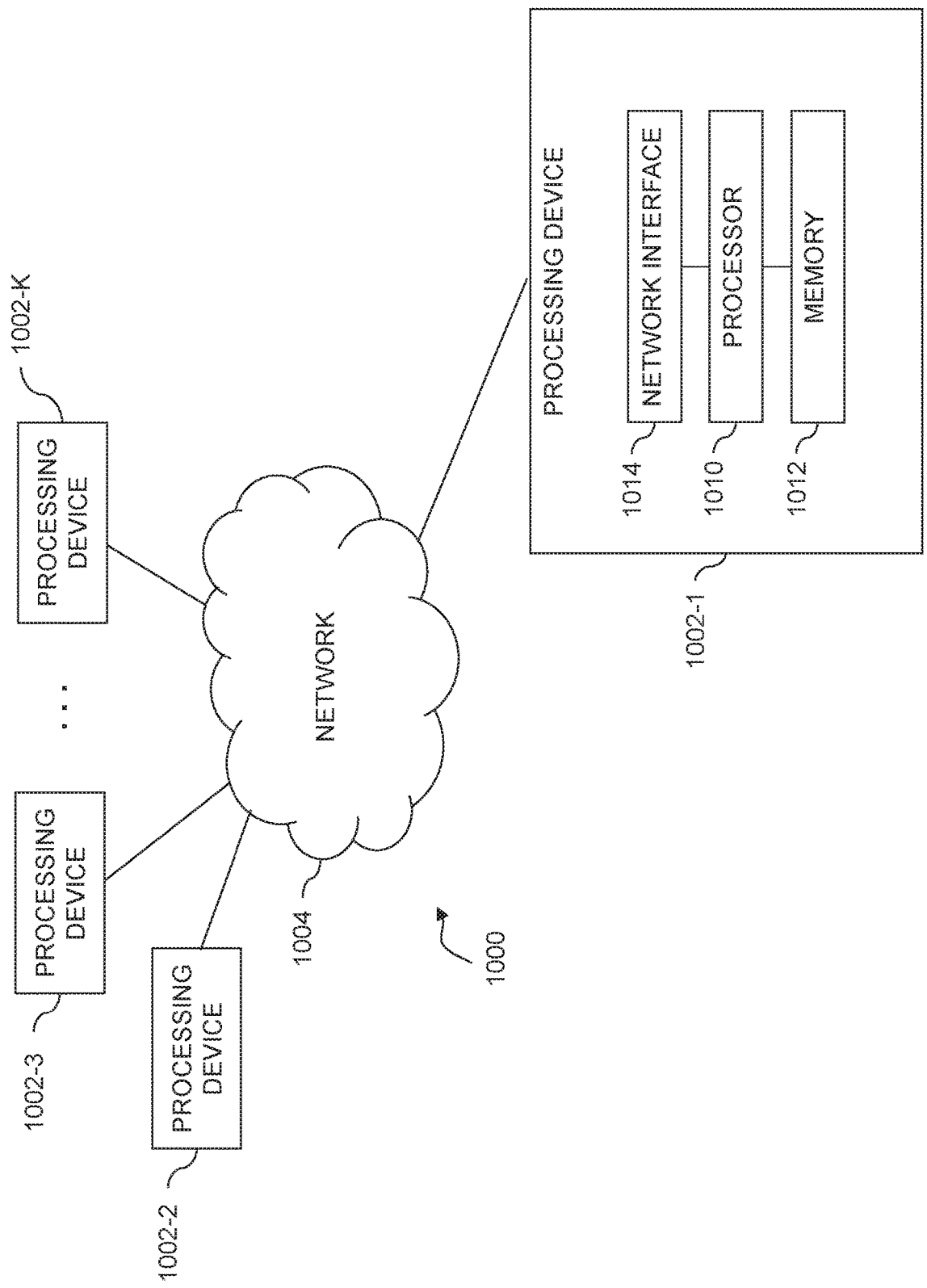

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   determining one or more server issues, among multiple reported server issues within at least one system of one or more servers, as being related at least in part to one or more software version states within the at least one system;
   labeling, using at least one clustering algorithm, each of at least a subset of the one or more servers as being associated with at least one of the one or more determined server issues;
   generating, by processing data pertaining to at least a portion of the one or more labeled servers using one or more artificial intelligence techniques, at least one knowledge base identifying one or more automated actions to be carried out in response to observed data related to the one or more server issues;
   monitoring one or more metrics across at least a portion of the one or more servers; and
   performing one or more automated actions based at least in part on the monitoring and the at least one knowledge base;
   wherein the method is performed by at least one processing device comprising a processor coupled to a memory.

2. The computer-implemented method of claim 1, further comprising:
   training at least one artificial intelligence-based specialized software agent using at least the at least one knowledge base.

3. The computer-implemented method of claim 2, wherein monitoring the one or more metrics across the at least a portion of the one or more servers is carried out automatically using the at least one artificial intelligence-based specialized software agent.

4. The computer-implemented method of claim 2, wherein performing the one or more automated actions is carried out using the at least one artificial intelligence-based specialized software agent upon a determination that at least one of multiple conditions specified in the at least one knowledge base is met.

5. The computer-implemented method of claim 4, wherein the one or more automated actions comprise automatically performing, via the at least one artificial intelligence-based specialized software agent, one or more software version upgrades within the at least one system.

6. The computer-implemented method of claim 1, wherein the one or more artificial intelligence techniques comprises at least one deep learning model, and wherein generating the at least one knowledge base comprises training the at least one deep learning model using the data pertaining to at least a portion of the one or more labeled servers.

7. The computer-implemented method of claim 1, wherein determining the one or more server issues related at least in part to one or more software version states comprises processing information pertaining to at least a portion of the multiple reported server issues using one or more chi-squared tests.

8. The computer-implemented method of claim 7, wherein determining the one or more server issues related at least in part to one or more software version states comprises selecting the one or more server issues having a statistical significance based on the one or more chi-squared tests.

9. The computer-implemented method of claim 1, wherein using the at least one clustering algorithm comprises processing configuration data of the one or more servers using the at least one clustering algorithm.

10. The computer-implemented method of claim 1, wherein labeling each of at least a subset of the one or more servers comprises creating at least one supervised dataset to map information pertaining to at least one of one or more software upgrades, one or more software versions, one or more server models, one or more server issue descriptions, and one or more server issue resolution actions.

11. The computer-implemented method of claim 1, wherein the observed data related to the one or more server issues comprise one or more parameter values for one or more parameter conditions that exceed a given threshold amount.

12. A non-transitory processor-readable storage medium having stored therein program code of one or more software programs, wherein the program code when executed by at least one processing device causes the at least one processing device:
to determine one or more server issues, among multiple reported server issues within at least one system of one or more servers, as being related at least in part to one or more software version states within the at least one system;
to label, using at least one clustering algorithm, each of at least a subset of the one or more servers as being associated with at least one of the one or more determined server issues;
to generate, by processing data pertaining to at least a portion of the one or more labeled servers using one or more artificial intelligence techniques, at least one knowledge base identifying one or more automated actions to be carried out in response to observed data related to the one or more server issues;
to monitor one or more metrics across at least a portion of the one or more servers; and
to perform one or more automated actions based at least in part on the monitoring and the at least one knowledge base.

13. The non-transitory processor-readable storage medium of claim 12, wherein the program code when executed by the at least one processing device further causes the at least one processing device:
to train at least one artificial intelligence-based specialized software agent using at least the at least one knowledge base.

14. The non-transitory processor-readable storage medium of claim 13, wherein monitoring the one or more metrics across the at least a portion of the one or more servers is carried out automatically using the at least one artificial intelligence-based specialized software agent.

15. The non-transitory processor-readable storage medium of claim 13, wherein performing the one or more automated actions is carried out using the at least one artificial intelligence-based specialized software agent upon a determination that at least one of multiple conditions specified in the at least one knowledge base is met.

16. The non-transitory processor-readable storage medium of claim 12, wherein the one or more artificial intelligence techniques comprises at least one deep learning model, and wherein generating the at least one knowledge base comprises training the at least one deep learning model using the data pertaining to at least a portion of the one or more labeled servers.

17. An apparatus comprising:
at least one processing device comprising a processor coupled to a memory;
the at least one processing device being configured:
to determine one or more server issues, among multiple reported server issues within at least one system of one or more servers, as being related at least in part to one or more software version states within the at least one system;
to label, using at least one clustering algorithm, each of at least a subset of the one or more servers as being associated with at least one of the one or more determined server issues;
to generate, by processing data pertaining to at least a portion of the one or more labeled servers using one or more artificial intelligence techniques, at least one knowledge base identifying one or more automated actions to be carried out in response to observed data related to the one or more server issues;
to monitor one or more metrics across at least a portion of the one or more servers; and
to perform one or more automated actions based at least in part on the monitoring and the at least one knowledge base.

18. The apparatus of claim 17, wherein the at least one processing device being further configured:
to train at least one artificial intelligence-based specialized software agent using at least the at least one knowledge base.

19. The apparatus of claim 18, wherein monitoring the one or more metrics across the at least a portion of the one or more servers is carried out automatically using the at least one artificial intelligence-based specialized software agent.

20. The apparatus of claim 18, wherein performing the one or more automated actions is carried out using the at least one artificial intelligence-based specialized software agent upon a determination that at least one of multiple conditions specified in the at least one knowledge base is met.

* * * * *